United States Patent
Tsutsumi et al.

(10) Patent No.: US 7,250,469 B2
(45) Date of Patent: Jul. 31, 2007

(54) RESIN MOLDED PRODUCT AND FUEL TANK

(75) Inventors: Daisuke Tsutsumi, Aichi (JP); Junji Koizumi, Aichi (JP); Koichiro Hayashi, Anjo (JP); Joji Kasugai, Inazawa (JP); Masahide Kobayashi, Inazawa (JP)

(73) Assignees: Toyoda Gosei Co., Ltd., Aichen-ken (JP); FTS Co., Ltd., Aichi (JP)

(*) Notice: Subject to any disclaimer, the term of this patent is extended or adjusted under 35 U.S.C. 154(b) by 420 days.

(21) Appl. No.: 10/824,506

(22) Filed: Apr. 15, 2004

(65) Prior Publication Data

US 2004/0220337 A1   Nov. 4, 2004

(30) Foreign Application Priority Data

Apr. 25, 2003 (JP) .......................... P2003-122163
Feb. 10, 2004 (JP) .......................... P2004-033272

(51) Int. Cl.
- C08F 8/08 (2006.01)
- C08L 65/02 (2006.01)
- B32B 27/38 (2006.01)

(52) U.S. Cl. ................ 525/107; 525/189; 428/413

(58) Field of Classification Search ................ 525/107, 525/189; 428/413
See application file for complete search history.

(56) References Cited

U.S. PATENT DOCUMENTS

| | | | |
|---|---|---|---|
| 3,354,129 A * | 11/1967 | Edmonds, Jr. et al. | 528/265 |
| 3,919,177 A * | 11/1975 | Campbell | 528/373 |
| 5,008,342 A * | 4/1991 | Phadke | 525/263 |
| 5,191,020 A * | 3/1993 | Masamoto et al. | 525/189 |
| 5,539,050 A * | 7/1996 | Fujii et al. | 525/68 |
| 5,625,002 A * | 4/1997 | Kadoi et al. | 525/189 |
| 6,740,707 B2 * | 5/2004 | Ono et al. | 525/64 |
| 6,740,709 B2 * | 5/2004 | Ono et al. | 525/68 |
| 6,747,094 B2 * | 6/2004 | Kinoshita et al. | 525/88 |
| 6,830,792 B1 * | 12/2004 | Matsuoka et al. | 428/35.7 |

(Continued)

FOREIGN PATENT DOCUMENTS

DE   689 23 583 T2   6/1988

(Continued)

OTHER PUBLICATIONS

Derwent Abstract of JP 2001/0160011 A to Nishimura et al., 'Polyphenylene Sulfide Resin Composition'; Jun. 13, 2000.*

Primary Examiner—Randy Gulakowski
Assistant Examiner—John J. Figueroa
(74) Attorney, Agent, or Firm—Posz Law Group, PLC

(57) ABSTRACT

A fuel tank produced in such a manner that an upper shell and a lower shell melt-molded as two split molded parts from a PPS resin composition are welded to each other at a welding portion. The PPS resin composition contains (a) 60% by weight to 95% by weight of a PPS resin, and (b) 5% by weight to 40% by weight of an olefin resin. The (a) PPS resin contains (a-1) a PPS resin having an MFR of 90 g/10 min to 350 g/10 min and an amount of extracts by chloroform of 2.2% by weight to 4.5% by weight. The (b) olefin resin contains (b-1) a specific olefin copolymer, and (b-2) an ethylene-α-olefin copolymer. The MFR of the PPS resin composition is 15 g/10 min to 50 g/10 min.

11 Claims, 2 Drawing Sheets

U.S. PATENT DOCUMENTS

| | | |
|---|---|---|
| 2003/0027931 A1 | 2/2003 | Ono et al. |
| 2003/0169237 A1 | 9/2003 | Jelinek et al. |

FOREIGN PATENT DOCUMENTS

| | | |
|---|---|---|
| EP | 345094 A1 * | 12/1989 |
| JP | A-56-115355 | 9/1981 |
| JP | A-59-167040 | 9/1984 |
| JP | A-61-21156 | 1/1986 |
| JP | UM-62-20922 | 2/1987 |
| JP | A-1-306467 | 12/1989 |
| JP | A-3-68656 | 3/1991 |
| JP | A-4-24388 | 1/1992 |
| JP | A-4-159364 | 6/1992 |
| JP | A-4-159365 | 6/1992 |
| JP | A-6-179791 | 6/1994 |
| JP | A-6-191296 | 7/1994 |
| JP | A-6-299071 | 10/1994 |
| JP | A-6-340033 | 12/1994 |
| JP | A-11-100506 | 4/1999 |
| JP | 2000160011 A * | 6/2000 |
| JP | A-2000-198923 | 7/2000 |
| JP | A-2002-226604 | 8/2002 |
| JP | A-2002-226706 | 8/2002 |
| JP | A-2002-226707 | 8/2002 |
| WO | WO 200127204 A1 * | 4/2001 |

* cited by examiner

RESIN MOLDED PRODUCT AND FUEL TANK

The present application is based on Japanese Patent Applications Nos. 2003-122163 and 2004-033272, which are incorporated herein by reference.

BACKGROUND OF THE INVENTION

1. Field of the Invention

The present invention relates to a resin molded product, especially a fuel tank.

2. Description of the Related Art

Resin fuel tanks for automobiles are classified into two types. In the first type, a fuel tank is integrally molded by blow molding. In the second type, two split molded parts are formed by injection molding and welded at a welding portion to thereby form a fuel tank.

(1) In the fuel tank integrally molded by blow molding, a high-density polyethylene (hereinafter abbreviated as HDPE) resin excellent in impact resistance and chemical resistance and inexpensive has been heretofore often used as a resin material of a parison. There is however a problem that the HDPE resin is high in fuel permeability. Therefore, a multilayer structure including a barrier layer made of an ethylene-vinyl alcohol (hereinafter abbreviated as EVOH) copolymer resin low in fuel permeability has been examined.

Unexamined Japanese Patent Publication No. Hei-6-340033 has disclosed a fuel tank as a multilayer structure having a polyolefin layer treated with a halogen compound or a sulfur compound, and a resin layer containing an EVOH copolymer or polyamide. FIGS. 2A and 2B show an applied example of the fuel tank. In FIGS. 2A and 2B, the fuel tank 60 is formed by blow molding of a parison 50 having a four-material six-layer structure as a laminate of an HDPE resin layer 53, an adhesive layer 52, a barrier layer 51 made of an EVOH copolymer, an adhesive layer 52, a regenerated resin layer 54, and an HDPE resin layer 53.

Unexamined Japanese Patent Publication No. Hei-6-191296 has disclosed an automobile fuel tank made of a multilayer hollow molded product having a laminated structure composed of a barrier layer containing an aromatic polyamide-Nylon-6 copolymeric polyamide resin as a main component, and inner and outer layers each containing an HDPE resin as a main component and bonded to both surfaces of the barrier layer respectively through adhesive layers each containing a modified HDPE resin as a main component.

(2) On the other hand, in the fuel tank formed in such a manner that two split molded parts formed by injection molding are welded at a welding portion, Nylon-6 and Nylon-12 are used as injection molding materials as disclosed in Japanese Utility Model Publication No. Sho-62-20922.

The fuel tank formed by blow molding as in (1) is inferior in production efficiency. Moreover, in the fuel tank (FIGS. 2A and 2B) disclosed in the above JP Hei-6-340033, parts of the barrier layer 51 are departed from each other so as to be discontinuous to each other because parts of the innermost HDPE resin layer 53 fuse at a pinch portion 55 for pinching a terminal at the time of blow molding. Because the pinch portion 55 is located in a place where fuel comes into contact with the inside of the pinch portion 55, there is a problem that (a small amount of) fuel is transmitted easily through the departing portion of the barrier layer 51. In addition, when parts such as a pump, a valve, etc. need to be mounted in the fuel tank, there are required a process of drilling a mount hole 56 in a general portion of the fuel tank, a process of tightening the parts through a gasket and a process of performing hot plate welding of PE resins. These processes cause a disadvantage in terms of transmission of fuel. These problems occur also in the fuel tank disclosed in the above JP Hei-6-191296.

In the fuel tank formed by injection molding and welding as in (2), the Nylon resins are low in barrier characteristic to fuel containing alcohol such as methanol or ethanol. There is a problem that a large amount of fuel is transmitted through the tank as a whole.

Therefore, the present inventors have tried injection-molding a fuel tank by using a composition containing a polyphenylene sulfide (hereinafter abbreviated as PPS) resin high in barrier characteristic at the initial stage of development of the invention. It has been however found that the PPS resin composition which has been ever developed has insufficient fluidity when it is used as a material for injection-molding a large-size molded product such as a fuel tank. The situation in which the PPS resin composition has been heretofore developed will be described below in brief.

The PPS resin has excellent properties adapted to engineering plastics, such as heat resistance, barrier characteristic, chemical resistance, electrical insulating characteristic, humidity resistance, heat resistance, etc. The PPS resin is mainly used for the purpose of injection-molding various kinds of electric/electronic parts, mechanical parts and automobile parts. The PPS resin is however lower in flexibility than other engineering plastics such as Nylon, PBT, etc. In the existing circumstances, the application of the PPS resin is limited. Improvement of the PPS resin is required earnestly.

Melt-bending of various kinds of soft resins etc. has been examined as a method of improving flexibility of the PPS resin.

For example, Unexamined Japanese Patent Publication No. Sho-59-167040 has disclosed a method of adding a hydrogenated SBR copolymer, and Unexamined Japanese Patent No. Sho-56-115355 has disclosed a method of adding a dicarboxylic anhydrate hydrogenated SBR copolymer. These SBR copolymers are however low in miscibility with the PPS resin, so that the flexibility improving effect cannot be obtained sufficiently.

Unexamined Japanese Patent Publication No. Sho-61-21156 has disclosed a method of adding an α-olefin-glycidyl methacrylate copolymer. In the invention described in the above JP Sho-61-21156, there has been not obtained any composition having an Izod impact strength of not lower than 700 J/m.

Unexamined Japanese Patent Publication No. Hei-4-159364 and Hei-4-159365 have disclosed a composition having a melt viscosity of not lower than a predetermined value and containing a PPS resin having a specific terminal group, and an olefin copolymer formed from α-olefin and α,β-unsaturated acid glycidyl ester. Also in the inventions described in the above JP Hei-4-159364 and Hei-4-159365, there has been not obtained any composition having a tensile elongation of not lower than 50% at break.

Unexamined Japanese Patent Publications No. Hei-6-179791 and Hei-6-299071 have disclosed a composition containing 70% by weight to 99.5% by weight of a mixture of α-olefin (10% by weight to 50% by weight) and α,β-unsaturated carboxylic alkyl ester (50% by weight to 90% by weight), and 0.5% by weight to 30% by weight of α,β-unsaturated acid glycidyl ester. Also in the above JP Hei-6-179791 and Hei-6-299071, there has been not obtained any composition having an Izod impact strength of not lower than 700 J/m.

On the other hand, Unexamined Japanese Patent Publications No. Hei-1-306467, No. Hei-3-68656 and No. 2000-198923 have succeeded in achieving high flexibility and high impact resistance simultaneously by mixing a PPS resin having a specific structure and an olefin copolymer at a predetermined ratio. Each composition capable of achieving very high impact resistance of not lower than 700 J/m, however, needs to contain an excessively large amount of a soft resin component. For this reason, there is a disadvantage in that heat resistance and chemical resistance as original characteristic of the PPS resin are worsened.

Unexamined Japanese Patent Publication No. Hei-11-100506 has disclosed a method in which at least one kind of anti-oxidizing agent selected from the group consisting of a phenol anti-oxidizing agent, a thioether anti-oxidizing agent and a phosphorus anti-oxidizing agent is added to an olefin copolymer to suppress thermal deterioration at the time of kneading or molding to thereby improve toughness. In the above JP Hei-11-100506, there has been not obtained any composition having an Izod impact strength of not lower than 700 J/m.

Therefore, a PPS resin excellent in impact resistance and relatively excellent in moldability such as fluidity has been proposed as follows.

Unexamined Japanese Patent Publication No. Hei-4-24388 has disclosed a composition containing a PPS resin, an epoxy group-containing olefin copolymer, and an elastomer containing neither epoxy group nor acid anhydrate group.

Unexamined Japanese Patent Publication No. 2002-226604 has disclosed a composition containing a PPS resin and an olefin resin and having a tensile elongation of not lower than 20% at break.

Unexamined Japanese Patent Publication No. 2002-226706 has disclosed a composition containing a PPS resin and an olefin resin and having an Izod impact strength of not lower than 700 J/m.

Unexamined Japanese Patent Publication No. 2002-226707 has disclosed parts of a fuel system, containing a PPS resin and an olefin resin and having a fuel transmission coefficient of not higher than $3.3 \times 10^{-16}$ mol·m/m²·s·Pa.

Particularly in the above JP 2002-226707, "a fuel tank, a valve, a fuel hose, a fuel hose joint, a fuel pump, a fuel pump housing, and a canister" have been shown as specific examples of parts of the fuel system. It is certainly possible to mold these specific examples from the PPS resin composition according to JP 2002-226707. According to the inventors' further examination of the PPS resin composition, it has been however found that the fuel tank formed from the PPS resin composition by injection molding lacks fluidity as described above. That is, high fluidity is required of the fuel tank because the fuel tank is a molded product which is relatively large in size but not thick (even in the case where the fuel tank is divided into two parts). The inventors have tried forming the fuel tank from the resin composition containing the PPS resin according to JP 2002-226707 by injection-molding (formation of two split parts). As a result, there is however a possibility that underfill may occur because the molding die cannot be filled with the resin composition.

SUMMARY OF THE INVENTION

An object of the invention is to solve the aforementioned problems, that is, to provide a resin molded product, especially a fuel tank, which is excellent in moldability and excellent in barrier characteristic, chemical resistance and impact resistance both in a general portion and in a welding portion and which is molded from a PPS resin composition uniquely excellent in balance among fluidity, barrier characteristic (especially, barrier characteristic to gasoline and alcohol) and chemical and impact resistance (especially, durability to gasoline and alcohol) and adapted to melt molding (especially, injection molding or injection press molding).

According to the inventors' examination to solve the problems, it has been found that the problems can be solved when a resin molded product, especially a fuel tank is melt-molded from a composition containing a PPS resin having a specific viscosity and an amount of extracts by chloroform, especially, a PPS resin collected by a flushing method and having a specific viscosity and an amount of extracts by chloroform, and an olefin resin combined with the PPS resin at a specific mixture ratio.

DETAILED DESCRIPTION OF THE PREFERRED EMBODIMENTS

Figure 1A:
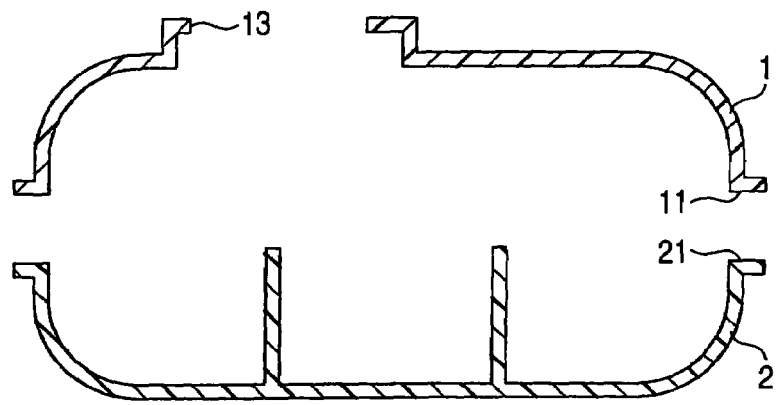
FIGS. 1A to 1C are sectional views of a fuel tank according to an embodiment of the invention.

That is, the invention provides a resin molded product described in the following paragraph [1] and a fuel tank described in the following paragraph [2].

[1] A resin molded product by melt molding of a PPS resin composition, wherein:
  the PPS resin composition contains (a) 60% by weight to 95% by weight of a PPS resin, and (b) 5% by weight to 40% by weight of an olefin resin;
  the (a) PPS resin contains (a-1) a PPS resin having a melt flow rate (315.5° C., 5000 g load) of 90 g/10 min to 350 g/10 min measured according to ASTM-D1238, and an amount of extracts by chloroform of 2.2% by weight to 4.5% by weight;
  the (b) olefin resin contains (b-1) an olefin copolymer prepared by introducing an epoxy group-containing monomer component into an olefin (co)polymer (note: (co)polymer means either polymer or copolymer), and (b-2) an ethylene-α-olefin copolymer prepared by copolymerizing 15% by weight to 35% by weight of ethylene and 65% by weight to 85% by weight of α-olefin containing 3 to 16 carbon atoms; and
  the PPS resin composition has a melt flow rate (hereinafter abbreviated as MFR) (315.5° C., 5000 g load) of 15 g/10 min to 50 g/10 min measured according to ASTM-D1238.

[2] A fuel tank including: a plurality of split molded parts formed by melt-molding of a PPS resin composition; and a welding portion where the plurality of split molded parts are welded, wherein:
  the PPS resin composition contains (a) 60% by weight to 95% by weight of a PPS resin, and (b) 5% by weight to 40% by weight of an olefin resin;

the (a) PPS resin contains (a-1) a PPS resin having an MFR (315.5° C., 5000 g load) of 90 g/10 min to 350 g/10 min measured according to ASTM-D1238, and an amount of extracts by chloroform of 2.2% by weight to 4.5% by weight; and the (b) olefin resin contains (b-1) an olefin copolymer prepared by introducing an epoxy group-containing monomer component into an olefin (co)polymer, and (b-2) an ethylene-α-olefin copolymer prepared by copolymerizing 15% by weight to 35% by weight of ethylene and 65% by weight to 85% by weight of α-olefin having 3 to 16 carbon atoms. Preferably, the PPS resin composition also has an MFR (315.5° C., 5000 g load) of 15 g/10 min to 50 g/10 min measured according to ASTM-D1238.

Preferably, in the paragraph [1] or [2], the (a-1) PPS resin is prepared by a flushing method. More preferably, the (a-1) PPS resin is not crosslinked by thermal oxidation.

The (a) PPS resin may contain (a-1) 100 parts by weight of a PPS resin, and (a-2) 5 parts by weight to 80 parts by weight of a PPS resin having an MFR (315.5° C., 5000 g load) of 50 g/10 min to 800 g/10 min measured according to ASTM-D1238 and an amount of extracts by chloroform of not higher than 1% by weight and being not crosslinked by thermal oxidation. Respective components of the PPS resin composition used in the invention will be described below in detail in connection with the aforementioned points.

[(a) PPS Resin]

The (a) PSS resin used in the invention is a polymer having a constitutional repeating unit represented by the following structural formula (I).

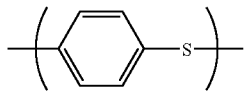

It is preferable from the point of view of heat resistance that the PPS resin contains 70% by mole or more, particularly 90% by mole or more, of the polymer having a constitutional repeating unit represented by the aforementioned structural formula.

Part of the constitutional repeating unit less than about 30% by mole in the PPS resin may be replaced by a constitutional repeating unit represented by any one of the following structures.

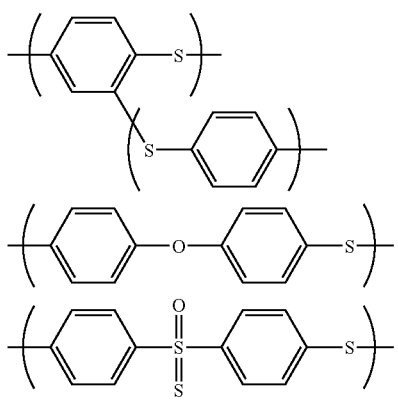

-continued

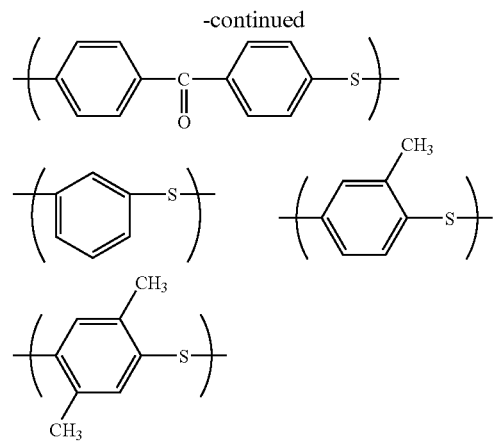

Because the melting point of the PPS polymer partially containing such a structure is lowered, it may be preferred from the point of view of moldability when the melting point of the resin composition according to the invention is low.

(a-1) PPS Resin

The (a-1) PPS resin used in the invention needs to have an MFR (315.5° C., 5000 g load) of 90 g/10 min to 350 g/10 min measured according to ASTM-D1238, and relatively high amount of extracts by chloroform of 2.2% by weight to 4.5% by weight. The amount of extracts by chloroform is a yardstick of the amount of organic low-polymerization component (oligomer). (The amount of extracts by chloroform is calculated on the basis of the amount of the residue after Soxhlet's extraction for 5 hours in the condition of 10 g of polymer and 200 mL of chloroform. Note: The PPS resin is generally produced by a method of collecting polymer by removing solvent after solution polymerization. The obtained polymer is powdery or granular. The PPS resin in such a state can be chloroform-extracted sufficiently if extraction time of 5 hours is provided. The quantity determined by the chloroform extraction is little affected by variation in particle size of the polymer even if the particle size varies more or less.) Preferably, the PPS resin has an MFR of 110 g/10 min to 330 g/10 min, and an amount of extracts by chloroform of 2.2% by weight to 4% by weight. Especially preferably, the PPS resin has an MFR of 150 g/10 min to 300 g/10 min, and an amount of extracts by chloroform of 2.3% by weight to 3.5% by weight. It is further preferable that the PPS resin is not crosslinked by thermal oxidation.

(a-2) PPS Resin

The (a-2) PPS resin used in the invention preferably has an MFR (315.5° C., 5000 g load) of 50 g/10 min to 800 g/10 min (more preferably, 60 g/10 min to 700 g/10 min) measured according to ASTM-D1238, and relatively low amount of extracts by chloroform of not higher than 1% by weight (calculated on the basis of the amount of the residue after Soxhlet's extraction for 5 hours in the condition of 10 g of polymer and 200 mL of chloroform). It is further preferable that the PPS resin is not crosslinked by thermal oxidation. Especially preferably, the PPS resin has an MFR of 60 g/10 min to 200 g/10 min, and an amount of extracts by chloroform of not higher than 0.7% by weight.

Each of the (a-1) and (a-2) PPS resins having the aforementioned characteristic can be produced at a high yield by a method in which a PPS resin obtained by a reaction of a polyhalogen aromatic compound and a sulfidizing agent in a polar organic solvent is collected and additionally treated.

A method for producing the (a) PPS resin used in the invention will be described below. A polyhalogen aromatic compound, a sulfidizing agent, a polymerization solvent, a polymerization assisting agent and a polymerization stabilizing agent used in the production method will be described first.

A. Polyhalogenated Aromatic Compound

The polyhalogenated aromatic compound used in the invention means a compound having two or more halogen atoms in one molecule. Specific examples of the compound include polyhalogenated aromatic compounds such as p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diiodobenzene, and 1-methoxy-2,5-dichlorobenzene. Preferably, p-dichlorobenzene is used. Although two or more different kinds of polyhalogenated aromatic compounds can be combined as a copolymer, it is preferable that a p-dihalogen aromatic compound is used as a main component.

From the point of view of obtaining a PPS resin having a viscosity suitable for processability, it can be exemplified that the amount of the polyhalogenated aromatic compound used is in a range of from 0.9 mole to 2.0 mole, preferably in a range of from 0.95 mole to 1.5 mole per 1 mole of the sulfidizing agent.

B. Sulfidizing Agent

Examples of the sulfidizing agent used in the invention include alkali metal sulfide, alkali metal hydrosulfide, and hydrogen sulfide.

Specific examples of the alkali metal sulfide include lithium sulfide, sodium sulfide, potassium sulfide, rubidium sulfide, cesium sulfide, and a mixture of two or more kinds of sulfides selected from these sulfides. Especially, sodium sulfide is used preferably.

Specific examples of the alkali metal hydrosulfide include sodium hydrosulfide, potassium hydrosulfide, lithium hydrosulfide, rubidium hydrosulfide, cesium hydrosulfide, and a mixture of two or more kinds of hydrosulfides selected from these hydrosulfides. Especially, sodium hydrosulfide is used preferably.

Alkali metal sulfide prepared from alkali metal hydrosulfide and alkali metal hydroxide in a reaction system in situ can be also used. The alkali metal sulfide prepared from alkali metal hydrosulfide and alkali metal hydroxide may be transferred to a polymerization tank when it is used.

Or alkali metal sulfide prepared from alkali metal hydroxide such as lithium hydroxide or sodium hydroxide and hydrogen sulfide in a reaction system in situ can be also used. The alkali metal sulfide prepared from alkali metal hydroxide such as lithium hydroxide or sodium hydroxide and hydrogen sulfide may be transferred to a polymerization tank when it is used.

When alkali metal hydrosulfide is used as the sulfidizing agent, it is especially preferable that alkali metal hydroxide is used along with the alkali metal hydrosulfide. It can be exemplified that the amount of the alkali metal hydroxide used is in a range of from 0.95 mole to 1.20 mole, preferably in a range of from 1.00 mole to 1.15 mole per 1 mole of the alkali metal hydrosulfide.

C. Polymerization Solvent

In the invention, an organic polar solvent is used as the polymerization solvent. Specific examples of the organic polar solvent include: N-alkyl pyrolidone solvents such as N-methyl-2-pyrolidone, and N-ethyl-2-pyrolidone; caprolactam solvents such as N-methyl-ε-caprolactam; aprotic organic solvents such as 1,3-dimethyl-2-imidazolidinone, N,N-dimethylacetamide, N-N-dimethylformamide, hexamethylphosphoric triamide, dimethyl sulfone, and tetramethylene sulfoxide; and mixtures of these solvents. These solvents can be used preferably because they are high in reaction stability. Especially, N-methyl-2-pyrolidone (hereinafter also abbreviated as NMP) is used preferably.

The amount of the organic polar solvent used is selected to be in a range of from 2.0 mole to 10 mole, preferably in a range of from 2.25 mole to 6.0 mole per 1 mole of the sulfidizing agent.

D. Polymerization Assisting Agent

In the invention, the polymerization assisting agent is preferably used so that a PPS resin high in the degree of polymerization can be obtained in a shorter time. The polymerization assisting agent means a substance having a function of increasing the viscosity of an obtained polyarylene sulfide resin. Specific examples of the polymerization assisting agent include organic carboxylate, water, alkali metal chloride, organic sulfonate, alkali metal sulfate, alkaline-earth metal oxide, alkali metal phosphate, and alkaline-earth metal phosphate. These may be used singly or two or more kinds may be used in combination. Especially, each or both of organic carboxylate and water may be used preferably.

The alkali metal carboxylate is a compound represented by the general formula $R(COOM)_n$, in which R is a group having 1 to 20 carbon atoms and selected from an alkyl group, a cycloalkyl group, an aryl group, an alkylaryl group and an arylalkyl group, M is alkali metal selected from lithium, sodium, potassium, rubidium and cesium, and n is an integer of 1 to 3. The alkali metal carboxylate may be used also as hydrate or anhydrate or as an aqueous solution. Specific examples of the alkali metal carboxylate include lithium acetate, sodium acetate, potassium acetate, sodium propionate, lithium valerate, sodium benzoate, sodium phenylacetate, potassium p-toluate, and a mixture of these substances. Among the examples of the alkali metal carboxylate, lithium salt is expensive though it has a large assisting effect because it has high solubility for a reaction system, whereas sodium acetate is used most preferably because it is inexpensive and has moderate solubility for a polymerization system.

When these polymerization assisting agents are used, the amount of the polymerization assisting agents used is selected to be generally in a range of from 0.01 mole to 0.7 mole per 1 mole of the charged alkali metal sulfide and preferably in a range of from 0.1 mole to 0.6 mole per 1 mole of the charged alkali metal sulfide in order to obtain a higher degree of polymerization.

E. Polymerization Stabilizing Agent

In the invention, the polymerization stabilizing agent may be used for stabilizing a polymerization reaction system to prevent a side reaction. The polymerization stabilizing agent contributes to stabilization of a polymerization reaction system to suppress an undesirable side reaction. Specific examples of the polymerization stabilizing agent include compounds such as alkali metal hydroxide, alkali metal carbonate, alkaline-earth metal hydroxide, and alkaline-earth metal carbonate. Especially, alkali metal hydroxide such as sodium hydroxide, potassium hydroxide or lithium hydroxide is preferred.

These polymerization stabilizing agents may be used singly or two or more kinds may be used in combination. The amount of the polymerization stabilizing agent used is selected to be generally in a range of from 0.02 mole to 0.2 mole, preferably in a range of from 0.03 mole to 0.1 mole per 1 mole of the charged alkali metal sulfide. If the rate of the polymerization stabilizing agent is too low, the stabilizing effect is insufficient. If the rate of the polymerization stabilizing agent is too high, there is a tendency toward poor economy and reduction in yield of polymer.

The time of addition of the polymerization stabilizing agent is not particularly limited. The polymerization stabilizing agent may be added at any point of time, that is, in a preparatory process (which will be described later), at the time of stating of polarization or in the middle of polymerization. The polymerization stabilizing agent may be added at several times separately. More preferably, the polymerization stabilizing agent may be added at once at the time of starting of the preparatory process or at the time of starting of polymerization because it is easy to add the polymerization stabilizing agent.

A preparatory process, a polarization reaction process, a collection process and an additional process in the method for producing the (a) PPS resin used in the invention will be described below specifically in due order.

1. Preparatory Process

In the method for producing the (a) PPS resin used in the invention, the sulfidizing agent is generally used in the form of hydrate. Before the polyhalogenated aromatic compound is added, a mixture containing the organic polar solvent and the sulfidizing agent is preferably heated to remove an excess of water to the outside of the system. Incidentally, when a larger amount of water than required is removed by this operation, a shortfall of water is preferably added and supplied.

As described above, alkali metal sulfide prepared from alkali metal hydrosulfide and alkali metal hydroxide in situ in a reaction system or in another vessel than the polymerization vessel may be also used as the sulfidizing agent. This method is not particularly limited. For example, there may be used a method in which: alkali metal hydrosulfide and alkali metal hydroxide are added into an organic polar solvent preferably under an atmosphere of inert gas in a temperature range of from ordinary temperature to 150° C., preferably in a temperature range of from ordinary temperature to 100° C.; and the mixture solution is heated to a temperature of at least 150° C., preferably to a temperature of 180° C. to 260° C. under ordinary pressure or reduced pressure to thereby remove (distill) water.

It is preferable that the amount of water in the polymerization system in the polymerization reaction is in a range of from 0.5 mole to 10.0 mole per 1 mole of the charged sulfidizing agent. The amount of water in the polymerization system means a value obtained by subtracting the amount of water removed to the outside of the polymerization system from the amount of water supplied to the polymerization system. Water supplied to the polymerization system may take any form of water, aqueous solution, crystal water, etc. Preferably, the amount of water is selected to be in a range of from 0.75 mole to 2.5 mole, especially in a range of from 1.0 mole to 1.25 mole per 1 mole of the sulfidizing agent. To adjust the amount of water in such a range, water may be added before polymerization or in the middle of polymerization.

2. Polymerization Reaction Process

In the invention, the sulfidizing agent and the polyhalogenated aromatic compound produce a reaction in the organic polar solvent in a temperature range of from 200° C. (inclusively) to 290° C. to thereby produce the PPS resin.

To start the polymerization reaction process, the sulfidizing agent and the polyhalogenated aromatic compound are added into the organic polar solvent preferably under an atmosphere of inert gas in a temperature range of from ordinary temperature to 220° C., preferably in a temperature range of from 100° C. to 220° C.

The resulting mixture is generally heated to a temperature in a range of from 200° C. to 290° C. The heating rate is not particularly limited. Generally, the heating rate is selected to be in a range of from 0.01° C./min to 5° C./min.

Generally, the mixture is finally heated to a temperature in a range of from 250° C. to 290° C. and produces a reaction at the temperature for a time of 0.25 hours to 50 hours, preferably for a time of 0.5 hours to 20 hours.

3. Collection Process

In the method for producing the (a) PPS resin used in the invention, a solid matter is collected from the polymerization reaction product including polymer, solvent, etc. after polymerization is completed. In the PPS resin used in the invention, how to collect the solid matter is an important issue.

That is, for example, a flushing method for performing the collection under a rapid cooling condition may be used in order to obtain the (a-1) PPS resin used in the invention and having an amount of extracts by chloroform of 2.2% by weight to 4.5% by weight. The flushing method is a method in which the polymerization reaction product is flushed from a state of high temperature and high pressure (generally, temperature of 250° C. or higher and pressure of 8 kg/cm$^2$ or higher) to an atmosphere of ordinary or reduced pressure to thereby perform collection of solvent and collection of pulverized polymer simultaneously. The flushing means jetting of the polymerization reaction product from a nozzle. Specifically, for example, an atmosphere of nitrogen or water vapor in ordinary pressure can be used as the atmosphere into which the polymerization reaction product is flushed. The temperature used in the flushing method is generally selected to be in a range of from 150° C. to 250° C. The flushing method is an economical collection method because the collection time can be relatively shortened as well as the solvent and the solid matter can be collected simultaneously.

For example, a method for performing collection by filtrating the solid matter after slowly cooling the polymerization reaction product while crystallizing the polymerization reaction product may be used as the method for collecting the (a-2) PPS resin used in the invention. In this method, production efficiency has a tendency toward slight reduction because the polymerization reaction product is cooled so slowly that the collection time becomes larger than that in the flushing method. In addition, a process for separating NMP from the solid matter needs to be provided separately. In this method, removal and ion exchange of remaining ionic compounds and organic low polymerization degree compounds from the collected solid matter can be however performed easily compared with the flushing method because the ionic compounds and organic low polymerization degree compounds are probably excluded from particles in the crystallizing process.

4. Additional Process

After the (a) PPS resin used in the invention is produced by the aforementioned polymerization and collection processes, the (a) PPS resin is preferably subjected to an acid treatment or a hot water treatment or cleaned with an organic solvent.

4-1. Case of Acid Treatment

Acid used in the acid treatment for the PPS resin used in the invention is not particularly limited if it has no function of decomposing the PPS resin. For example, acetic acid, hydrochloric acid, sulfuric acid, phosphoric acid, silicic acid, carbonic acid, propylic acid, etc. may be used. Especially, acetic acid and hydrochloric acid can be used more preferably. It is undesirable to use acid such as nitric acid having the function of decomposing and deteriorating the PPS resin.

For example, a method of immersing the PPS resin in acid or in an aqueous solution of acid may be used for the acid treatment. The PPS resin may be stirred or heated properly if necessary. When, for example, acetic acid is used, a sufficient effect can be obtained if PPS resin powder is stirred for 30 minutes in the condition that the PPS resin powder is immersed in an aqueous acetic acid solution of pH 4 heated to a temperature of 80° C. to 90° C. The PPS resin subjected to the acid treatment needs to be cleaned with water or hot water by several times in order to remove remaining acid or salt physically. Preferably, distilled water or deionized water is used as the water used for the cleaning so that the effect of preferable chemical modification of the PPS resin due to the acid treatment is not spoiled.

4-2. Case of Hot Water Treatment

In the hot water treatment for the PPS resin used in the invention, it is important that the temperature of hot water is selected to be not lower than 100° C., more preferably not lower than 120° C., further preferably not lower than 150° C., especially preferably not lower than 170° C. If the temperature of hot water is selected to be lower than 100° C., the effect of preferable chemical modification of the PPS resin is low undesirably.

To exhibit the effect of preferable chemical modification of the PPS resin due to hot water cleaning in the invention, the water used is preferably distilled water or deionized water. The hot water treatment is generally carried out as follows. A predetermined amount of the PPS resin is put in a predetermined amount of water. In a pressure vessel, the PPS resin is heated and stirred. The ratio of the PPS resin to water is preferably selected so that the amount of water is larger than the amount of the PPS resin. Generally, a bath ratio of 200 g or less of the PPS resin to 1000 g of water is selected.

It is undesirable that terminal groups are decomposed. It is therefore preferable that an atmosphere of inert gas is used in the hot water treatment in order to avoid decomposition of the terminal groups. The PPS resin subjected to the hot water treatment is preferably cleaned with hot water by several times in order to remove remaining components.

4-3. Case of Cleaning with Organic Solvent

The organic solvent used for cleaning the PPS resin used in the invention is not particularly limited if it has no function of decomposing the PPS resin. Examples of the organic solvent include: nitrogen-containing polar solvents such as N-methylpyrolidone, dimethylformamide, dimethylacetoamide, 1,3-dimethylimidazolidinone, hexamethylphosphorous amide, and piperazinone; sulfoxide/sulfone solvents such as dimethyl sulfoxide, dimethyl sulfone, and sulfolane; ketone solvents such as acetone, methyl ethyl ketone, diethyl ketone, and acetophenone; ether solvents such as dimethyl ether, dipropyl ether, dioxane, and tetrahydrofuran; halogen solvents such as chloroform, methylene chloride, trichloroethylene, ethylenedichloride, perchloroethylene, monochloroethane, dichloroethane, tetrachloroethane, perchloroethane, and chlorobenzene; alcohol/phenol solvents such as methanol, ethanol, propanol, butanol, pentanol, ethylene glycol, propylene glycol, phenol, creosol, polyethylene glycol, and polypropylene glycol; and aromatic hydrocarbon solvents such as benzene, toluene, and xylene. Among these organic solvents, N-methylpyrolidone, acetone, dimethylformamide and chloroform may be used especially preferably. These organic solvents may be used singly or two or more kinds may be used in combination.

A method of immersing the PPS resin in an organic solvent may be used for cleaning the PPS resin with the organic solvent. The PPS resin may be stirred or heated suitably if necessary.

The cleaning temperature used at the time of cleaning the PPS resin with the organic solvent is not particularly limited. For example, the cleaning temperature can be selected suitably to be in a range of from ordinary temperature to about 300° C. The cleaning efficiency has a tendency toward increase as the cleaning temperature increases. Generally, the cleaning effect can be obtained sufficiently when the cleaning temperature is in a range of from ordinary temperature to 150° C. A pressure vessel may be used so that the PPS resin can be cleaned under pressure at a temperature of not lower than the boiling point of the organic solvent.

The cleaning time is not particularly limited, either. The cleaning time varies according to the cleaning condition. In the case of batch cleaning, a sufficient effect can be generally obtained when the PPS resin is cleaned for a time of 5 minutes or longer. Alternatively, the PPS resin may be cleaned by a continuous cleaning method.

The acid treatment, the hot water treatment and cleaning with the organic solvent may be used in suitable combination in order to obtain the (a-1) and (a-2) PPS resins having the target melt viscosity and the amount of extracts by chloroform.

5. Others

The (a-1) PPS resin used in the invention may be highly polymerized by a thermal oxidation crosslinking process using heating under an atmosphere of oxygen and heating in a state of addition of a crosslinking agent such as peroxide after completion of polymerization.

When a dry heating process is to be performed in order to highly polymerize the PPS resin by thermal oxidation crosslinking, the temperature used in the dry heating process is selected to be preferably in a range of from 160° C. to 260° C., more preferably in a range of from 170° C. to 250° C. The oxygen concentration is selected to be not lower than 5% by volume, preferably not lower than 8% by volume. The upper limit of the oxygen concentration is not particularly restricted but is generally about 50% by volume. The processing time is selected to be preferably in a range of from 1 hour to 100 hours, more preferably in a range of from 2 hours to 50 hours, further preferably in a range of from 3 hours to 25 hours. The apparatus used for the heating process may be a hot air dryer used generally or may be a rotary or agitating element-including heater. When efficient and more uniform processing is required, the rotary or agitating element-including heater may be used preferably.

The dry heating process may be performed so that volatile components can be removed while thermal oxidation crosslinking is suppressed. The temperature used in this case is selected to be preferably in a range of from 130° C. to 250° C., more preferably in a range of from 160° C. to 250° C. The oxygen concentration used in this case is selected to be lower than 5% by volume, preferably lower than 2% by volume. The processing time is selected to be preferably in a range of from 0.5 hours to 50 hours, more preferably in a range of 1 hour to 20 hours, further preferably in a range of from 1 hour to 10 hours. The apparatus used for the heating process may be a hot air dryer used generally or may be a rotary or agitating element-including heater. When efficient and more uniform processing is required, the rotary or agitating element-including heater may be used preferably.

The (a-1) PPS resin obtained by the aforementioned production method exhibits high amount of extracts by chloroform of 2.2% by weight to 4.5% by weight as a yardstick of the amount of organic low polymerization degree components because the (a-1) PPS is collected by the flushing method. That is, because the residual ratio of oligomer is relatively high, the (a-1) PPS resin can be obtained as a PPS resin excellent in yield and fluidity. The (a-3) PPS resin according to the background art exhibits low impact resistance even in the case where the PPS resin is alloyed with polyolefin because low molecular (high MFR) PPS collected by the flushing method is highly polymerized by thermal oxidation crosslinking. On the contrary, the (a-1) PPS resin used in the invention can be used as a PPS resin excellent in impact resistance because the (a-1) PPS resin is relatively high in molecular weight and exhibits an MFR of 90 g/10 min to 350 g/10 min. Preferably, the (a-1) PPS resin used in the invention is substantially straight-chain PPS which is not highly polymerized by the thermal oxidation crosslinking process so that the target impact resistance can be achieved.

According to the invention, the (a-1) PPS resin can be used in combination with the (a-2) PPS resin not collected by the flushing method, that is, collected by another method than the flushing method and having an MFR of 50 g/10 min to 800 g/10 min (preferably, 60 g/10 min to 700 g/10 min) and small amount of extracts by chloroform of not higher than 1% by weight. The amount of the (a-2) PPS resin is selected to be in a range of from 5 parts by weight to 80 parts by weight, preferably in a range of from 10 parts by weight to 60 parts by weight per 100 parts by weight of the (a-1) PPS resin. If the amount of the (a-2) PPS resin is larger than 80 parts by weight, fluidity balance tends to be worsened.

The PPS resin obtained in the aforementioned manner is excellent in heat resistance, chemical resistance, flame retardance, electrical property and mechanical property and particularly adapted to melt molding (especially, injection molding or injection press molding).

[(b) Olefin Resin]

(b-1) Epoxy Group-Containing Olefin Copolymer

The (b-1) epoxy group-containing olefin copolymer used in the invention is an olefin copolymer obtained by introducing an epoxy group-containing monomer component into an olefin (co)polymer.

Examples of the functional group-containing component for introducing an epoxy group-containing monomer component into the olefin (co)polymer include epoxy group-containing monomers such as glycidyl acrylate, glycidyl methacrylate, glycidyl ethacrylate, glycidyl itaconate, and glycidyl citraconate.

The method for introducing the epoxy group-containing components is not particularly limited. For example, the epoxy group-containing monomer component may be copolymerized with α-olefin as described above. For example, a radical polymerization initiator maybe used for graft-introducing the epoxy group-containing monomer component into the olefin (co)polymer.

The amount of the epoxy group-containing monomer component introduced is suitably selected to be in a range of from 0.001% by mole to 40% by mole, preferably in a range of from 0.01% by mole to 35% by mole with respect to the total amount of the epoxy group-containing olefin copolymer.

An especially useful example of the (b-1) epoxy group-containing olefin copolymer used in the invention is an olefin copolymer containing α-olefin and α, β-unsaturated carboxylic glycidyl ester as essential copolymerization components. A preferred example of the α-olefin is ethylene. These copolymers may be further copolymerized with α, β-unsaturated carboxylic acid and its alkyl ester such as acrylic acid, methyl acrylate, ethyl acrylate, butyl acrylate, methacrylic acid, methyl methacrylate, ethyl methacrylate, and butyl methacrylate.

In the invention, an olefin copolymer containing ethylene and α, β-unsaturated carboxylic glycidyl ester as essential copolymerization components may be used particularly preferably. Especially, an olefin copolymer containing 65% by weight to 98% by weight of ethylene and 2% by weight to 35% by weight of α, β-unsaturated carboxylic glycidyl ester as essential copolymerization components is particularly preferred.

Examples of the α, β-unsaturated carboxylic glycidyl ester are compounds represented by the formula:

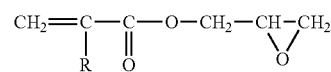

in which R is a hydrogen atom or a lower alkyl group.

Specific examples of the α, β-unsaturated carboxylic glycidyl ester include glycidyl acrylate, glycidyl methacrylate, and glycidyl ethacrylate. Especially, glycidyl methacrylate is used preferably.

Specific examples of the olefin copolymer containing ethylene and α, β-unsaturated carboxylic glycidyl ester as essential copolymerization components include ethylene/propylene-g-glycidyl methacrylate copolymer (in which "g" is an abbreviation for graft and will be used hereinafter), ethylene/butene-1-g-glycidyl methacrylate copolymer, ethylene/glycidyl acrylate copolymer, ethylene/glycidyl methacrylate copolymer, ethylene/methyl acrylate/glycidyl methacrylate copolymer, and ethylene/methyl methacrylate/glycidyl methacrylate copolymer. Especially, ethylene/glycidyl methacrylate copolymer, ethylene/methyl acrylate/glycidyl methacrylate copolymer and ethylene/methyl methacrylate/glycidyl methacrylate copolymer are used preferably.

(b-2) Ethylene-α-Olefin Copolymer

A particularly useful example of the (b-2) ethylene-α-olefin copolymer used in the invention and containing ethylene and α-olefin having 3 to 16 carbon atoms is a copolymer containing ethylene and at least one kind of α-olefin having 3 to 16 carbon atoms. Specific examples of the α-olefin having 3 to 16 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1- pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, and a mixture of these. Of these examples of α-olefin, a copolymer using α-olefin having 6 to 12 carbon atoms is preferably used because improvement in mechanical strength and greater improvement in property modifying effect can be obtained.

i) MFR of Olefin Resin

The MFR (measured according to ASTM-D1238 at 190° C. under a load of 2160 g) of the (b) olefin resin used in the invention is selected to be preferably in a range of from 0.01 g/10 min to 60 g/10 min, more preferably in a range of from 0.03 g/10 min to 50 g/10 min. If the MFR is lower than 0.01 g/10 min, fluidity becomes poor. If the MFR is higher than 60 g/10 min, impact strength may be lowered according to the shape of the molded product. Accordingly, it is necessary to pay attention to the range of the MFR.

ii) Amount of Added Olefin Resin

In the invention, 60% by weight to 95% by weight of the (a) PPS resin and 5% by weight to 40% by weight of the (b) olefin resin are mixed with each other. Preferably, 70% by weight to 85% by weight of the (a) PPS resin and 15% by weight to 30% by weight of the (b) olefin resin are mixed with each other. If the amount of the olefin resin is smaller than 5% by weight, it is difficult to obtain the effect of improvement in flexibility and impact resistance. If the amount of the olefin resin is larger than 40% by weight, viscosity at melt kneading increases so that injection moldability tends to be spoiled undesirably as well as the original property of the PPS resin such as thermal stability and chemical barrier characteristic is spoiled.

iii) Mixture Proportion of (b-1) and (b-2)

In the invention, it is necessary to use the (b-1) epoxy group-containing olefin copolymer and the (b-2) ethylene-α-olefin copolymer in combination as described above. As for the mixture proportion of (b-1) and (b-2), 15% by weight to 40% by weight of the (b-1) component and 60% by weight to 85% by weight of the (b-2) component are mixed with each other on the assumption that the total amount of (b-1) and (b-2) is 100% by weight. Preferably, 15% by weight to 35% by weight of the (b-1) component and 65% by weight to 85% by weight of the (b-2) component are mixed with each other. If the amount of the (b-1) component is smaller than 15% by weight, it is difficult to obtain the target impact resistance. If the amount of the (b-1) component is larger than 40% by weight, viscosity at melt kneading tends to increase.

The following anti-oxidizing agents or other additives may be further mixed with the PPS resin composition used in the invention.

(c) Anti-Oxidizing Agent

In the invention, it is preferable that at least one kind of anti-oxidizing agent selected from phenol anti-oxidizing agents and phosphorus anti-oxidizing agents is added to 100 parts by weight of the mixture of the (a) and (b) components in order to keep high heat resistance and thermal stability. From the point of view of effect of improvement in heat resistance, the amount of the anti-oxidizing agent is preferably selected to be not smaller than 0.01 parts by weight, especially not smaller than 0.02 parts by weight. From the point of view of gas components generated during molding, the amount of the anti-oxidizing agent is preferably selected to be not larger than 5 parts by weight, especially not larger than 1 part by weight. Preferably, the phenol anti-oxidizing agent and the phosphorus anti-oxidizing agent may be used in combination so that a large effect in keeping heat resistance and thermal stability can be particularly improved.

A. Phenol Anti-Oxidizing Agent

A hindered phenol compound is preferably used as the phenol anti-oxidizing agent. Specific examples of the hindered phenol compound include triethylene glycol-bis[3-t-butyl-(5-methyl-4-hydroxyphenyl)propionate], N,N'-hexamethylene-bis(3,5-di-t-butyl-4-hydroxyhydrocinnamide), tetrakis[methylene-3-(3',5'-di-t-butyl-4'-hydroxyphenyl)propionate]methane, pentaerythrityltetrakis[3-(3',5'-di-t-butyl-4'-hydroxyphenyl)propionate], 1,3,5-tris(3,5-di-t-butyl-4-hydroxybenzyl)-s-triazine-2,4,6-(1H,3H,5H)-trione, 1,1,3-tris(2-methyl-4-hydroxy-5-t-butylphenyl)butane, 4,4'-butylidene-bis(3-methyl-6-t-butylphenol), n-octadecyl-3-(3,5-di-t-butyl-4-hydroxy-phenyl)propionate, 3,9-bis[2-(3-(3-t-butyl-4-hydroxy-5-methylphenyl)propionyloxy)-1,1-dimethylethyl]-2,4,8,10-tetraoxaspiro[5,5]undecane, and 1,3,5-trimethyl-2,4,6-tris-(3,5-di-t-butyl-4-hydroxybenzyl)benzene.

B. Phosphorus Anti-Oxidizing Agent

Examples of the phosphorus anti-oxidizing agent include bis(2,6-di-t-butyl-4-methylphenyl)pentaerythritol-di-phosphite, bis(2,4-di-t-butylphenyl)pentaerythritol-di-phosphite, bis(2,4-di-cumylphenyl)pentaerythritol-di-phosphite, tris(2,4-di-t-butylphenyl)phosphite, tetrakis(2,4-di-t-butylphenyl)-4,4'-bisphenylenephosphite, di-stearylpentaerythritol-di-phosphite, triphenylphosphite, and 3,5-di-butyl-4-hydroxybenzyl phosphonate diethyl ester.

Especially, an anti-oxidizing agent having a high melting point is used preferably in order to reduce volatilization and decomposition of the anti-oxidizing agent in the PPS resin compound. Specifically, bis(2,6-di-t-butyl-4-methylphenyl)pentaerythritol-di-phosphite, bis(2,4-di-t-butylphenyl)pentaerythritol-di-phosphite and bis(2,4-di-cumylphenyl)pentaerythritol-di-phosphite are used preferably.

[(d) Other Additives]

A: Other Resins than Olefin Resin

Other resins than the olefin resin may be further added to the PPS resin composition according to the invention as long as the effect of the invention is not spoiled. When, for example, a small amount of a thermoplastic resin high in flexibility is added, both flexibility and impact resistance can be improved more greatly. If the amount is larger than 50% by weight with respect to the total amount of the composition, the original property of the PPS resin is spoiled undesirably. Particularly, 30% by weight or less of the thermoplastic resin may be used preferably. Specific examples of the thermoplastic resin include a polyamide resin, a polybutylene terephthalate resin, a polyethylene terephthalate resin, a modified polyphenylene ether resin, a polysulfone resin, a polyallyl sulfone resin, a polyketone resin, a polyether imide resin, a polyallylate resin, a liquid crystal polymer, a polyether sulfone resin, a polyether ketone resin, a polythioether ketone resin, a polyether ether ketone resin, a polyimide resin, a polyamide resin, and a tetrafluoropolyethylene resin.

B. Modifying Compound

The following compounds can be added in order to modify property. That is, the compounds which can be added include: a coupling agent such as an isocyanate compound, an organic silane compound, an organic titanate compound, an organic borane compound or an epoxy compound; a plasticizing agent such as a polyalkylene oxide oligomer compound, a thioether compound, an ester compound or an organic phosphorus compound; a crystal nucleus agent such as talc, kaoline, an organic phosphorus compound or polyether ether ketone; metal soap such as montanic wax, lithium stearate or aluminum stearate; a releasing agent such as ethylene diamine/strearic acid/sebacic acid polycondensate or a silicone compound; a color protection agent such as hypophosphite; and other general addition agents such as a lubricant, an ultraviolet light protection agent, a coloring agent, a flame retardant and a foaming agent. If the amount of any one of the aforementioned compounds is larger than 20% by weight with respect to the total amount of the composition, the original property of the PPS resin is spoiled undesirably. Accordingly, the amount of any one of the aforementioned compounds is selected to be not larger than 10% by weight, preferably not larger than 1% by weight. In the invention, a coupling agent such as organic silane may be preferably added in order to improve thermal property more greatly. The amount of the organic silane is selected to be in a range of from 0.1 parts by weight to 3 parts by weight, preferably in a range of from 0.5 parts by weight to 2.5 parts by weight with respect to 100 parts by weight of the (a) PPS resin.

C: Filler

A filler can be added to the PPS resin composition obtained by the method according to the invention as long as the effect of the invention is not spoiled. Examples of the filler include a fibrous filler, and a non-fibrous filler. Specific examples of the fibrous filler include glass fiber, carbon fiber, potassium titanate whisker, zinc oxide whisker, calcium carbonate whisker, wollastonite whisker, aluminum borate whisker, aramid fiber, alumina fiber, silicon carbide fiber, ceramic fiber, asbestos fiber, gypsum fiber, and metal fiber. Specific examples of the non-fibrous filler include: silicate such as talc, wollastonite, zeolite, sericite, mica, kaoline, clay, pyrophillite, bentonite, asbestos, and alumina silicate; metal compounds such as silicon oxide, magnesium oxide, alumina, zirconium oxide, titanium oxide, and iron oxide; carbonate such as calcium carbonate, magnesium carbonate, and dolomite; sulfate such as calcium sulfate, and barium sulfate; hydroxide such as calcium hydroxide, magnesium hydroxide, and aluminum hydroxide; and other non-fibrous fillers such as glass beads, glass flakes, glass powder, ceramic beads, boron nitride, silicon carbide, carbon black, silica, and graphite. These fillers may be hollow. Two or more kinds of fillers selected from the aforementioned fillers may be used in combination. These fillers may be preparatorily treated with coupling agents such as an isocyanate compound, an organic silane compound, an organic titanate compound, an organic borane compound, and an epoxy compound.

[Process of Kneading PPS Resin Composition]

A generally known melt kneader such as a single-screw extruder, a double-screw extruder, a Banbury mixer, a kneader or a mixing roll can be used as the kneader. A method of kneading the PPS resin composition at a processing temperature higher by a value of 5° C. to 60° C. than the melting peak temperature of the PPS resin in the condition that the PPS resin composition is supplied to the melt kneader can be used as a typical example. Preferably, shear force is selected to be relatively strong so that the dispersal form of the olefin copolymer can be controlled as described above. Specifically, there may be preferably used a method of kneading the PPS resin composition by a double-screw extruder so that the resin temperature at mixing can be selected to be higher by a value of 10° C. to 20° C. than the melting peak temperature of the PPS resin. In this case, the mixing sequence of raw materials is not particularly limited. There may be used any method such as a method of melt-kneading all added raw materials by the aforementioned technique, a method of melt-kneading part of added raw materials by the aforementioned technique and then kneading the other part of the added raw materials or a method of melt-kneading part of added raw materials by a single-screw or double-screw extruder while mixing the other part of the raw materials by a side feeder. It is a matter of course that minor additive components may be added before molding but after the other components are kneaded and pelletized by the aforementioned technique.

[MFR of PPS Resin Composition]

When the MFR (315.5° C., 5000 g load) of the PPS resin composition used in the invention is measured according to ASTM-D1238, the MFR is preferably in a range of from 15 g/10 min to 50 g/10 min, more preferably in a range of from 17 g/10 min to 33 g/10 min, most preferably in a range of from 20 g/10 min to 28 g/10 min. If the MFR is lower than 15 g/10 min, the PPS resin composition is undesirable because fluidity is insufficient to melt-mold a large-size resin molded product, especially a fuel tank. On the other hand, if the MFR is higher than 50 g/10 min, the PPS resin composition is undesirable because both impact resistance and tensile strength are lowered.

[Resin Molded Product]

The resin molded product according to the invention is not particularly limited. For example, the resin molded product can be used for various kinds of purposes such as parts and interior parts of an automobile, parts and a casing of an electric/electronic appliance, parts and a casing of a mechanical apparatus, and a body and a casing of an indoor apparatus. Particularly, the invention is especially useful for melt-molding (especially, injection molding) a large-size resin molded product because the PPS resin composition used is excellent in impact resistance and fluidity. The large-size resin molded product is not particularly limited. Examples of the large-size resin molded product include a fuel tank, a volatile oil tank, a boat, and a bathtub.

EXAMPLES

The invention will be described below more specifically in connection with examples of the PPS resin composition used.

In the following examples, material characteristic was measured as follows.

[MFR]

MFR was measured by a method according to ASTM-D1238-86 in the condition of a measuring temperature of 315.5° C. and a load of 5000 g.

[Amount of Extracts by Chloroform]

Soxhlet's extraction (at a bath temperature of 120° C. for 5 hours) was performed by 200 mL of chloroform in the condition that 10 g of PPS polymer was weighed in cylindrical filter paper. After extraction, chloroform was removed. The amount of the residue was weighed and calculated per the weight of the polymer.

[Izod Impact Strength]

A test piece injection-molded was additionally treated so as to be notched. Notched Izod impact strength was measured according to ASTM-D256.

[−40° C. Izod Impact Strength]

Notched Izod impact strength was measured according to ASTM-D256 except that a temperature atmosphere was set at −40° C.

[Liquid-Absorbance of Alcohol Gasoline]

An ASTM No. 1 tensile test piece (⅛ inches thick) prepared by injection molding was immersed in alcohol gasoline in an autoclave. The alcohol gasoline was a mixture consisting of 90% by weight of model gasoline (containing 50% by volume of toluene, and 50% by volume of isooctane) and 10% by weight of ethanol. After immersion, the test piece was put in an explosion-proof oven at 60° C. and left for 24 hours. The rate of increase in weight at liquid absorption was calculated as liquid-absorbance on the basis of absolute dry weight just after molding and weight after absorption of liquid to the alcohol gasoline.

$$LA(\%)=\{(Wa-Wd)/Wd\}\times100$$

in which LA is liquid-absorbance, Wa is weight after absorption of liquid, and Wd is absolute dry weight.

[Reference Example 1] Preparation of PPS-1

In a 20-liter autoclave having a stirrer and a valve provided at its bottom, 2371 g (19.9 mole) of 47% sodium hydrosulfide (Sankyo Kasei Co., Ltd.), 831 g (20.0 mole) of 96% sodium hydroxide, 3960 g (40.0 mole) of N-methyl-2-pyrolidone (NMP), 623 g (7.6 mole) of sodium acetate and 3000 g of ion-exchange liquid were put. While nitrogen was imported into the autoclave, the mixture was slowly heated up to 225° C. under ordinary pressure for about 3.5 hours, so that 4150 g of water and 80 g of NMP were distilled. Then, the reactor was cooled to 160° C. The amount of water remaining in the system was 0.18 mole per 1 mole of the charged alkali metal sulfide. The amount of hydrogen sulfide scattered was 0.023 mole.

Then, 2910 g (19.8 mole) of p-dichlorobenzene (Sigma Aldrich Corp.) and 1495 g (15.1 mole) of NMP were added into the reactor. The reactor was sealed hermetically under nitrogen gas. Then, while stirred at 400 rpm, the mixture was heated from 200° C. to 225° C. at a rate of 0.8° C./min and kept at 225° C. for 30 minutes. Then, the mixture was heated to 273° C. at a rate of 0.3° C./min and kept at 273° C. for 50 minutes. Then, the mixture was heated to 281° C. While the mixture was pressurized by nitrogen in the condition that the evacuation valve provided at the bottom of the autoclave was opened, the mixture was flushed to a stirrer-including bottle for 15 minutes. The mixture was stirred at 250° C. for a time so that a large part of NMP was removed. In this manner, a solid matter containing PPS and salts was collected.

The obtained solid matter and 15200 g of ion-exchange liquid were put in a stirrer-including autoclave. After cleaning at 70° C. for 30 minutes, a glass filter was used for performing suction filtration. Then, 17330 g of ion-exchange liquid heated to 70° C. was injected into the glass filter. Suction filtration was performed to obtain a cake.

The obtained cake and 11980 g of ion-exchange liquid were put in a stirrer-including autoclave. After the inside of the autoclave was replaced by nitrogen, the mixture was heated to 192° C. and kept at 192° C. for 30 minutes. Then, the autoclave was cooled and the content of the autoclave was taken out.

After the content of the autoclave was suction-filtrated by a glass filter, 17380 g of ion-exchange liquid at 70° C. was poured thereto. Suction filtration was performed to obtain a cake. The obtained cake was dried in hot air at 80° C. and further dried in a vacuum at 120° C. for 24 hours. In this manner, dried PPS was obtained.

The obtained PPS-1 exhibited an MFR of 210 g/10 min and an amount of extracts by chloroform of 2.7%.

Reference Example 2 Preparation of PPS-2

Polymerization, cleaning, collection and drying were performed in the same manner as in Reference Example 1 except that the amount of p-dichlorobenzene added was set at 2925 g (19.9 mole).

The obtained PPS-2 exhibited an MFR of 260 g/10 min and an amount of extracts by chloroform of 2.8%.

Reference Example 3 Preparation of PPS-3

In a 20-liter autoclave having a stirrer, 2382 g (20.0 mole) of 47% sodium hydrosulfide (Sankyo Kasei Co., Ltd.), 849 g (20.4 mole) of 96% sodium hydroxide, 3267 g (33 mole) of N-methyl-2-pyrolidone (NMP), 531 g (6.5 mole) of sodium acetate and 3000 g of ion-exchange liquid were put. While nitrogen was imported into the autoclave, the mixture was slowly heated up to 225° C. for about 3 hours under ordinary pressure. After 4200 g of water and 80 g of NMP were distilled, the reactor was cooled to 160° C. The amount of hydrogen sulfide scattered was 0.018 mole per 1 mole of the charged alkali metal sulfide.

Then, 2974 g (20.2 mole) of p-dichlorobenzene (Sigma Aldrich Corp.) and 2594 g (26.2 mole) of NMP were added into the reactor. The reactor was sealed hermetically under nitrogen gas. Then, while stirred at 400 rpm, the mixture was heated to 228° C. at a rate of 0.8° C./min. Then, the mixture was heated to 270° C. at a rate of 0.6° C./min and kept at 270° C. for 150 minutes. Then, while the mixture was cooled to 250° C. at a rate of 1.3° C./min, 684 g (38 mole) of ion-exchange liquid was forced into the autoclave. Then, the mixture was cooled to 200° C. at a rate of 0.4° C./min. Then, the mixture was rapidly cooled to room temperature.

The content of the autoclave was taken out and diluted with 10 liters of NMP. Then, the content was filtrated into a solvent and a sold matter by a sieve (80 mesh). The obtained particles were cleaned with 20 liters of hot water by several times and filtrated. Then, the particles were put into 10 liters of NMP heated to 100° C. After stirred for about 1 hour, the mixture was filtrated and further cleaned with hot water by several times. Then, the mixture was cleaned with 20 liters of hot water containing 9.8 g of acetic acid and filtrated. Then, the mixture was cleaned with 20 liters of hot water and filtrated. In this manner, PPS polymer particles were obtained. The PPS polymer particles were dried in hot air at 80° C. and further dried in a vacuum at 120° C. for 24 hours. In this manner, dried PPS was obtained. The obtained PPS-3 exhibited an MFR of 185 g/10 min and an amount of extracts by chloroform of 0.3%.

Examples 1 to 4

In each of Examples 1 to 4, respective components shown in Table 1 were blended at a dry weight ratio shown in Table 1. Then, a twin-screw extruder TEX30 made by The Japan Steel Works, Ltd. was used so that the mixture was melted and kneaded at a screw rotational speed of 200 rpm and pelletized by a strand cutter in the condition that the cylinder temperature was set to be in a range of from 260° C. to 290° C. The obtained pellet was dried at 110° C. for one night. The pellet was injection-molded into a test piece at a cylinder temperature of 300° C. and at a mold temperature of 130° C. by an injection molding apparatus IS100FA made by Toshiba Machine Co., Ltd. MFR, fuel barrier characteristic, molding stability and material strength of each sample were measured. Results of the measurement were as shown in Table 1.

Comparative Example 1

Pelletization and evaluation were performed in the same manner as in Example 1 except that olefin-1 was used singly as the olefin resin. Results were as shown in Table 1. The obtained material was poor in fluidity and impact resistance.

Comparative Example 2

Pelletization and evaluation were performed in the same manner as in Example 1 except that PPS-3 obtained in Reference Example 3 was used. Results were as shown in Table 1. The obtained material was poor in fluidity and chemical resistance.

Comparative Example 3

Pelletization and evaluation were performed in the same manner as in Example 1 except that 55% by weight of an olefin resin was used. Results were as shown in Table 1. The obtained material was poor in fluidity.

TABLE 1

| | | | Amount of Extracts by Chloroform (wt %) | MFR (g/10 mm) |
|---|---|---|---|---|
| PPS resin | (a-1) | PPS-1 | 2.7 | 210 |
| | (a-2) | PPS-2 | 2.8 | 260 |
| | | PPS-3 | 0.3 | 185 |
| Olefin resin | (b-1) | Olefin-1 | | |
| | (b-2) | Olefin-2 | | |
| | | Olefin-3 | | |
| Anti-oxidizing agent | | Phenol type | | |
| | | Phosphorus type | | |
| Fluidity | | MFR | | |
| Izod impact strength (notched) | | 23° C. | | |
| | | −40° C. | | |
| Alcohol gasoline liquid-absorbance | | | | |

| | Example | | | | | |
|---|---|---|---|---|---|---|
| | 1 | 2 | 3 | 4 | 5 | 6 |
| Wt % | 75 | 70 | 70 | | 75 | 55 |
| Wt % | | | | 70 | | |
| Wt % | | | | | | 15 |
| Wt % | 10 | 10 | 8 | 10 | 5 | 10 |
| Wt % | 15 | | 10 | | | |
| Wt % | | 20 | 12 | 20 | 20 | 20 |
| Wt % | | 0.2 | 0.2 | 0.2 | 0.2 | 0.2 |
| Wt % | | 0.2 | 0.2 | 0.2 | 0.2 | 0.2 |
| g/10 min | 26 | 16 | 19 | 23 | 32 | 24 |
| J/m | 750 | 880 | 830 | 790 | 700 | 810 |
| J/m | 710 | 850 | 820 | 770 | 620 | 790 |
| % | 1.05 | 1.32 | 1.33 | 1.30 | 1.13 | 1.22 |

| | Comparative Example | | |
|---|---|---|---|
| | 1 | 2 | 3 |
| Wt % | 75 | | 55 |
| Wt % | | | |
| Wt % | | 70 | |
| Wt % | 25 | 10 | 25 |
| Wt % | | 20 | |
| Wt % | | | 20 |
| Wt % | | | 0.2 |
| Wt % | | | 0.2 |
| g/10 min | 5 | 11 | 2 |
| J/m | 350 | 780 | 720 |
| J/m | 70 | 760 | 690 |
| % | 1.04 | 1.84 | 13.5 |

PPS1 to PPS3: PPS resins described in Reference Examples 1 to 3

Olefin-1: copolymer containing 88% by weight of ethylene and 12% by weight of glycidyl methacrylate and having an MFR of 3 g/10 min Olefin-2: ethylene/1-butene copolymer having density of 864 Kg/m$^3$ and an MFR of 3.5 g/10 min Olefin-3: ethylene/1-butene copolymer having density of 861 Kg/m$^3$ and an MFR of 0.5 g/10 min Phenol type:

3,9-bis[2-(3-(3-t-butyl-4-hydroxy-5-methylphenyl)propionyloxy)-1,1-dimethylethyl]-2,4,8,10-tetraoxaspiro[5,5]undecane Phosphorus type:

bis(2,4-di-cumylphenyl)pentaerythritol-di-phosphite

Figure 1B:
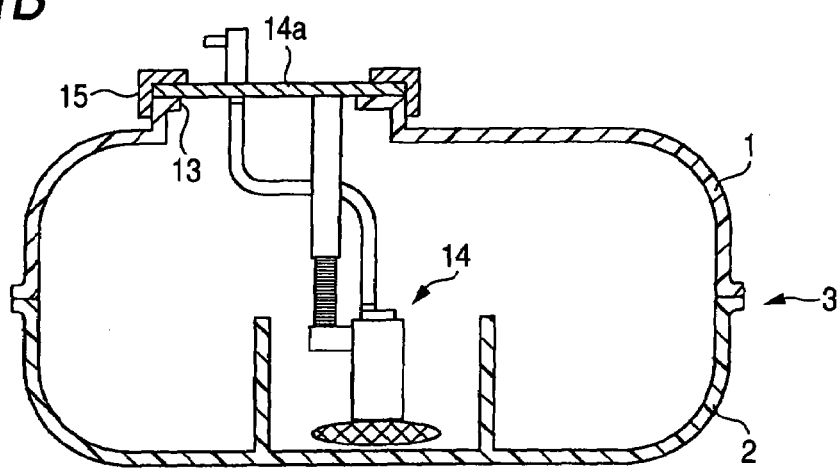
Figure 1C:
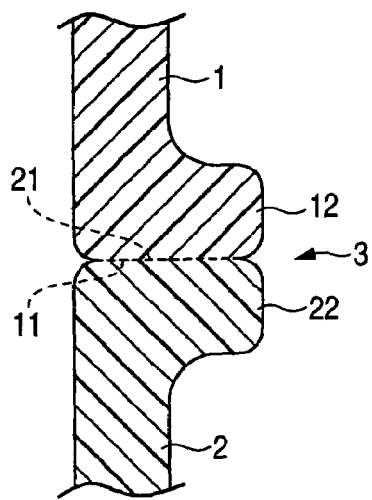
Figure 2A:
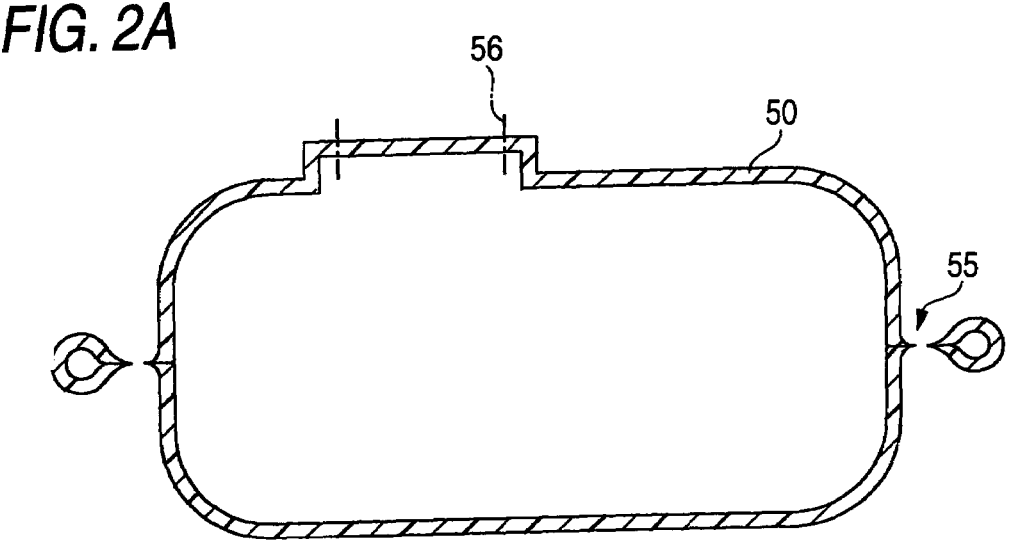
FIGS. 2A and 2B are sectional views of a fuel tank according to the background art.
Figure 2B:
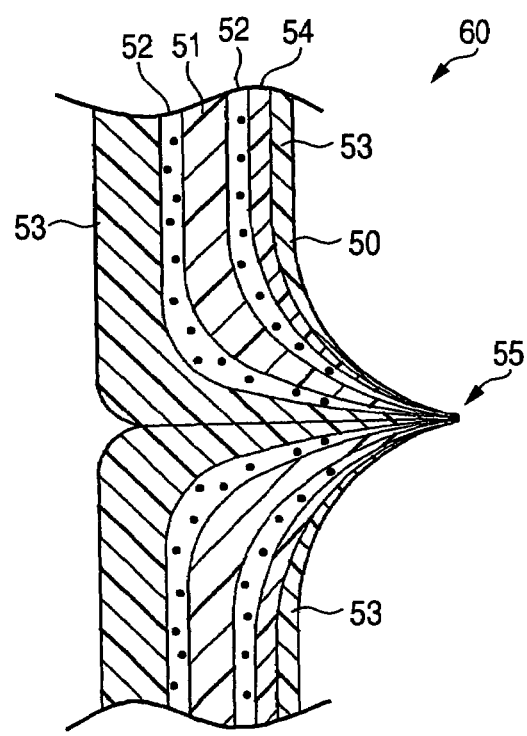

The PPS resin composition obtained in each of Examples 1 to 4 was used for producing a fuel tank shown in FIGS. 1A to 1C. The fuel tank has an upper shell 1, a lower shell 2, and a welding portion 3. The upper shell 1 and the lower shell 2 are two split molded parts formed by injection molding. The upper shell 1 is shaped like an inverted cup having a bottom at its top so as to be opened downward. The lower shell 2 is shaped like a cup having a bottom and opened upward. The upper shell 1 and the lower shell 2 are welded to each other at the welding portion 3. A general portion of each of the upper and lower shells 1 and 2 has a thickness of about 4 mm and an inner size of about 400 mm wide by about 600 mm deep. The depth from the lower opening of the upper shell 1 to the inner ceiling thereof is about 150 mm. The depth from the upper opening of the lower shell 2 to the inner bottom thereof is about 150 mm. The welding portion 3 is a portion where a lower end surface 11 (having a flange 12 formed in such a manner that the circumferential edge is protruded outward in the example shown in FIGS. 1A to 1C) of the upper shell 1 and an upper end surface 21 (having a flange 22 formed in the same manner as described above) of the lower shell 2 are made to abut on each other. Amount hole 13 is formed in the upper surface (general portion) of the upper shell 1. A mount plate 14a of a pump module 14 is applied to the mount hole 13 and tightened by a lock ring 15 through a gasket (not shown).

The fuel tank was produced by the following steps.

(1) The PPS resin composition obtained in each of Examples 1 to 4 is injected into an upper shell molding die to thereby injection-mold the upper shell 1. The PPS resin composition is injected into a lower shell molding die to thereby injection-mold the lower shell 2 in the same manner as described above (FIG. 1A).

(2) The lower end surface 11 of the upper shell 1 and the upper end surface 21 of the lower shell 2 are heated by a hot plate and made to abut on each other (hot plate welding) to thereby form the welding portion 3 (FIGS. 1B and 1C).

(3) The mount plate 14a of the pump module 14 is tightened to the mount hole 13 (which is generally formed at the time of injection molding but may be formed by drilling after injection molding) of the upper shell 1 by the lock ring 15 (FIG. 1B).

The fuel tank according to this embodiment has the following action and effect.

(A) The MFR is 26, 23, 32 or 24 g/10 min (each satisfying a range of from 15 g/10 min to 50 g/10 min). Accordingly, because the PPS resin composition obtained in each of Examples 1 to 4 and moderately high in fluidity is used for injection-molding the upper and lower shells 1 and 2, the upper and lower shells 1 and 2 are excellent in moldability though they are relatively large-size split molded parts. Accordingly, both impact resistance and tensile strength can be ensured while underfill can be avoided.

On the contrary, when the PPS resin composition obtained in each of Comparative Examples 1 to 3 and having an MFR of 5, 11 or 2 g/10 min (each lower than 15 g/10 min) was used for injection-molding the upper and lower shells 1 and 2, underfill was caused.

On the other hand, when the PPS resin composition having the MFR exceeding 50 g/10 min was used for injection-molding the upper and lower shells 1 and 2, impact resistance was lowered.

(B) Because the PPS resin composition high in barrier characteristic (especially barrier characteristic to gasoline and alcohol) is used for injection-molding the upper and lower shells 1 and 2, transmission of fuel in the general portion can be suppressed. Because the PPS resin composition is a PPS matrix, the welding portion 3 is formed as a structure in which parts of PPS fuse together. Accordingly, the barrier characteristic of the welding portion 3 becomes equal to that of the general portion, so that transmission of fuel in the welding portion 3 can be suppressed. As a result of suppression of transmission of fuel both in the general portion and in the welding portion in this manner, the fuel tank using the PPS resin obtained in each of Examples 1 to 4 exhibited fuel transmission of about 5 mg/m$^2$ in the DBL (Diurnal Breathing Loss) test according to the law of CARB (California Air Resources Board) under the condition that a fuel tank of the same size formed from a Nylon resin by injection molding and welding exhibited fuel transmission of about 20 mg/m$^2$ to 30 mg/m$^2$.

(C) Because the PPS resin composition excellent in impact resistance and chemical resistance is used, a fuel tank excellent in chemical resistance and impact resistance can be obtained.

The invention is not limited to the embodiment. For example, changes may be made suitably as follows without departing from the gist of the invention.

(1) The upper and lower shells 1 and 2 are formed by injection press molding.

(2) The PPS resin composition according to the embodiment is used for melt-molding other resin molded parts than the fuel tank for various applications.

(3) The PPS resin composition according to the embodiment is used for melt-molding resin molded parts having no welding portion.

As described above in detail, in accordance with the invention, a PPS resin composition uniquely excellent in balance among fluidity, barrier characteristic (especially, barrier characteristic to gasoline and alcohol) and chemical and impact resistance (especially, durability to gasoline and alcohol) and adapted to melt-molding (especially, injection molding and injection press molding) is used so that it is possible to obtain a resin molded product, especially a fuel tank, excellent in moldability and excellent in barrier characteristic and chemical and impact resistance of the general portion and the welding portion.

Further, the present invention is not limited to the above-mentioned embodiments. It can be carried out in various modes without departing from the scope of the invention.

What is claimed is:

1. A resin molded product by melt molding of a polyphenylene sulfide resin composition, said polyphenylene sulfide resin composition comprising:
    (a) 60% by weight to 95% by weight of polyphenylene sulfide resin, and
    (b) 5% by weight to 40% by weight of an olefin resin;
    said (a) polyphenylene sulfide resin comprising:
        (a-1) 100 parts by weight of a polyphenylene sulfide resin that is not cross-linked by thermal oxidation and having a melt flow rate (315.5° C., 5000 g load) of 90 g/10 min to 350 g/10 min measured according to ASTM-D1238, and an amount of extracts by chloroform of 2.2% by weight to 4.5% by weight, and
        (a-2) 5 parts by weight to 80 parts by weight of a polyphenylene sulfide resin having a melt flow rate (315.5° C. 5000 g load) of 50 g/10 min to 800 g/10 min measured according to ASTM-D1238 and an amount of extracts by chloroform of not higher than 1% by weight and being not cross-linked by thermal oxidation; and
    said (b) olefin resin comprising a mixture of:
        (b-1) an olefin copolymer prepared by introducing an epoxy group-containing monomer component into an olefin (co)polymer, and
        (b-2) an ethylene-α-olefin copolymer prepared by copolymerizing 15% by weight to 35% by weight of ethylene and 65% by weight to 85% by weight of α-olefin containing 3 to 16 carbon atoms; and
    said polyphenylene sulfide resin composition having a melt flow rate (315.5° C., 5000 g load) of 15 g/10 min to 50 g/10 min measured according to ASTM-D1238.

2. A resin molded product according to claim 1, wherein said (a-1) polyphenylene sulfide resin is prepared by a flushing method.

3. A resin molded product according to claim 1, wherein said (b) olefin resin has a melt flow rate (190° C., 2160 g load) of 0.01 g/10 min to 60 g/10 min measured according to ASTM-D1238.

4. A resin molded product according to claim 1, wherein said polyphenylene sulfide resin composition comprises:
    (a) 70% by weight to 85% by weight of said polyphenylene sulfide resin, and
    (b) 15% by weight to 30% by weight of said olefin resin.

5. A fuel tank comprising: a plurality of split molded parts formed by melt-molding of a polyphenylene sulfide resin composition; and a welding portion where said plurality of split molded parts are welded, said polyphenylene sulfide resin composition comprising:
    (a) 60% by weight to 95% by weight of polyphenylene sulfide resin, and
    (b) 5% by weight to 40% by weight of an olefin resin;
    said (a) polyphenylene sulfide resin comprising:
        (a-1) 100 parts by weight of a polyphenylene sulfide resin that is not cross-linked by thermal oxidation and having a melt flow rate (315.5° C., 5000 g load) of 90 g/10 min to 350 g/10 min measured according to ASTM-D1238, and an amount of extracts by chloroform of 2.2 % by weight to 4.5% by weight, and (a-2) 5 parts by weight to 80 parts by weight of a polyphenylene sulfide resin having a melt flow rate (315.5° C., 5000 g load) of 50 g/10 min to 800 g/10 min measured according to ASTM-D1238 and an amount of extracts by chloroform of not higher than 1% by weight and being not cross-linked by thermal oxidation; and said (b) olefin resin comprising a mixture of:

(b-1) an olefin copolymer prepared by introducing an epoxy group-containing monomer component into an olefin (co)polymer, and (b-2) an ethylene-α-olefin copolymer prepared by copolymerizing 15% by weight to 35% by weight of ethylene and 65% by weight to 85% by weight of α-olefin containing 3 to 16 carbon atoms.

6. A fuel tank according to claim 5, wherein said polyphenylene sulfide resin composition has a melt flow rate (315.5° C., 5000 g load) of 15 g/10 min to 50 g/10 min measured according to ASTM-D1238.

7. A fuel tank according to claim 5, wherein said (a-1) polyphenylene sulfide resin is prepared by a flushing method.

8. A fuel tank according to claim 5, wherein said (b) olefin resin has a melt flow rate (190° C., 2160 g load) of 0.01 g/10 min to 60 g/10 min measured according to ASTM-D1238.

9. A fuel tank according to claim 5, wherein said polyphenylene sulfide resin composition comprises:

(a) 70% by weight to 85% by weight of said polyphenylene sulfide resin, and (b) 15% by weight to 30% by weight of said olefin resin.

10. A resin molded product according to claim 1, wherein said olefin (b) contains 15% by weight to 40% by weight of said (b-1) component and 60% by weight to 85% by weight of said (b-2) component based on a total of 100% by weight of said (b-1) and (b-2) components.

11. A fuel tank according to claim 5, wherein said olefin (b) contains 15% by weight to 40% by weight of said (b-1) component and 60% by weight to 85% by weight of said (b-2) component based on a total of 100% by weight of said (b-1) and (b-2) components.

* * * * *